United States Patent
Saez et al.

(10) Patent No.: US 11,364,623 B2
(45) Date of Patent: Jun. 21, 2022

(54) COMPONENT ASSEMBLY SYSTEM

(71) Applicant: GM Global Technology Operations LLC, Detroit, MI (US)

(72) Inventors: Miguel A. Saez, Clarkston, MI (US); John P. Spicer, Plymouth, MI (US); James W. Wells, Rochester Hills, MI (US); Jeffrey A. Abell, Rochester Hills, MI (US); Muhammad E. Abdallah, Rochester Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 798 days.

(21) Appl. No.: 16/277,341

(22) Filed: Feb. 15, 2019

(65) Prior Publication Data

US 2020/0262057 A1 Aug. 20, 2020

(51) Int. Cl.
*B25J 9/16* (2006.01)
*B25J 9/00* (2006.01)
*B25J 13/08* (2006.01)
*B25J 15/00* (2006.01)

(52) U.S. Cl.
CPC ............ *B25J 9/009* (2013.01); *B25J 9/0084* (2013.01); *B25J 9/1682* (2013.01); *B25J 13/085* (2013.01); *B25J 13/088* (2013.01); *B25J 15/0052* (2013.01)

(58) Field of Classification Search
CPC ........ B25J 9/0084; B25J 9/009; B25J 9/1682; B25J 9/13085; B25J 9/088; B25J 15/0052; G05B 2219/39149
See application file for complete search history.

(56) References Cited

U.S. PATENT DOCUMENTS

| 6,193,142 B1* | 2/2001 | Segawa .................... B25J 9/009 219/127 |
| 2009/0123264 A1* | 5/2009 | Hartmann .............. B25J 9/1682 414/798.2 |
| 2015/0118003 A1* | 4/2015 | Bacalia .................. B25J 9/1682 414/816 |
| 2017/0050277 A1* | 2/2017 | Shi ....................... B25J 15/0061 |

FOREIGN PATENT DOCUMENTS

| DE | 102004021388 A1 | 12/2005 |
| DE | 102004049332 A1 | 4/2006 |
| DE | 102012112025 B4 | 6/2014 |

(Continued)

*Primary Examiner* — Dale Moyer
(74) *Attorney, Agent, or Firm* — Vivacqua Crane, PLLC

(57) ABSTRACT

A component assembly system comprises a first robot arm having a first end-of-arm tool mounted thereon and adapted to grasp a first subcomponent; a second robot arm having a second end of arm tool mounted thereon and adapted to grasp a second subcomponent. A system controller is adapted to control the first and second robot arms and first and second end-of-arm tools to position the first and second subcomponents relative to one another. A first interlocking mechanism is mounted onto the first end-of-arm tool and a second interlocking mechanism is mounted onto the second end-of-arm tool, wherein the first and second interlocking mechanisms engage one another and lock the first end-of-arm tool to the second end-of arm tool, thereby locking the first and second subcomponents into an initial position relative to one another.

20 Claims, 4 Drawing Sheets

(56) References Cited

FOREIGN PATENT DOCUMENTS

| | | |
|---|---|---|
| DE | 102016114863 A1 | 2/2017 |
| DE | 102016116404 A1 | 3/2017 |
| EP | 2227356 B1 | 9/2010 |
| EP | 2824526 A2 | 1/2015 |
| WO | WO-2005087451 A1 * | 9/2005 .............. B25J 9/009 |

* cited by examiner

COMPONENT ASSEMBLY SYSTEM

INTRODUCTION

The present disclosure relates to a component assembly system and to a method of assembling a component.

A manufacturing system typically moves, transforms, or operates on parts, subassemblies, and/or assemblies that must be accurately located and held in place for manufacturing and assembly operations. For example, a sheet metal part or steel plate, subassembly, or assembly may need to be accurately located and held in place to conduct assembly, welding, and inspection operations in a vehicle assembly plant or along an assembly line for items such as appliances, aircraft, furniture, and electronics. Part locating fixtures are normally used for this purpose.

Part locating fixtures typically include a plurality of fixed pins that are configured to fit into a plurality of locating holes defined by a part, and one or more clamps that are configured to hold the part in place. Part locating fixtures are generally useable for only one particular part size and/or shape and usually need to be modified or rebuilt to locate and hold a differently sized and/or shaped part. Multiple part locating fixtures are typically required for the wide variety of parts and the wide variety of assembly and manufacturing operations in a manufacturing plant. Thus, while current systems achieve their intended purpose, there is a need for a new and improved system and method for assembling a component, and more particularly to assemble a component while applying external forces to the component without using traditional fixtures.

SUMMARY

According to several aspects of the present disclosure, a method of assembling a component comprises, grasping a first subcomponent with a first end-of-arm tool, wherein the first end-of-arm tool is attached to a first robot arm and grasping a second subcomponent with a second end-of-arm tool, wherein the second end-of-arm tool is attached to a second robot arm. Moving the first and second end-of-arm tools to engage the first and second subcomponents and applying a first force on the first and second subcomponents with the first and second robot arms and establishing an initial position of the second subcomponent relative to the first subcomponent without releasing the first subcomponent from the first end-of-arm tool and without releasing the second subcomponent from the second end-of-arm tool. Locking the first and second end-of-arm tools to one another, wherein the first and second end-of-arm tools hold the first and second subcomponents together under the first load and at the initial position. Switching the first and second robot arms from position control to force control, wherein the first and second robot arms no longer exert the first force onto the first and second components and only exert forces on the first and second end-of-arm tools to compensate for gravitational forces to support the end-of-arm tools. Applying external loads, independent of the first force, to the first and second subcomponents to distort the first and second subcomponents relative to the initial position and establish a working position of the second subcomponent relative to the first subcomponent without releasing the first subcomponent from the first end-of-arm tool and without releasing the second subcomponent from the second end-of-arm tool.

According to another aspect of the present disclosure, the method further comprises, after applying external loads, independent of the first force, to the first and second subcomponents to distort the first and second subcomponents relative to the initial position and establish a working position of the second subcomponent relative to the first subcomponent without releasing the first subcomponent from the first end-of-arm tool and without releasing the second subcomponent from the second end-of-arm tool, forming a joint between the first subcomponent and the second subcomponent with a joining tool attached to a joining robot arm to thereby assemble the component, unlocking the first and second end-of-arm tools from one another, and releasing the first end-of-arm tool, releasing the second end-of-am tool, and dropping the component.

According to another aspect of the present disclosure, the method further comprises, after forming a joint between the first subcomponent and the second subcomponent with a joining tool attached to a joining robot arm to thereby assemble the component, removing the external loads from the first and second subcomponents.

According to another aspect of the present disclosure, the method further comprises, after locking the first and second end-of-arm tools to one another, wherein the first and second end-of-arm tools hold the first and second subcomponents together under the first load and at the initial position, confirming that the first and second end-of-arm tools are locked to one another and sending a lock confirmation signal to a system controller.

According to another aspect of the present disclosure, applying external loads, independent of the first force, to the first and second subcomponents to distort the first and second subcomponents relative to the initial position and establish a working position of the second subcomponent relative to the first subcomponent without releasing the first subcomponent from the first end-of-arm tool and without releasing the second subcomponent from the second end-of-arm tool further comprises activating at least one of a plurality of linear actuators mounted on at least one of the first and second end-of-arm tools to apply forces on the first and second subcomponents.

According to another aspect of the present disclosure, the method further comprises, simultaneously, while forming a joint between the first subcomponent and the second subcomponent with a joining tool attached to a joining robot arm to thereby assemble the component; independently varying the amount of force applied by each of the plurality of linear actuators throughout the forming of the joint.

According to several aspects of the present disclosure, a component assembly system comprises a first robot arm having a first end-of-arm tool mounted thereon and adapted to grasp a first subcomponent and a second robot arm having a second end of arm tool mounted thereon and adapted to grasp a second subcomponent, wherein each of the first and second end-of-arm tools has single side part holding capability. A system controller adapted to control the first and second robot arms and first and second end-of-arm tools to position the first and second subcomponents relative to one another and apply a first force on the first and second subcomponents to establish an initial position of the second subcomponent relative to the first subcomponent. An interlocking mechanism mounted onto at least one of the first end-of-arm tool and the second end-of-arm tool, wherein the interlocking mechanism locks the first end-of-arm tool to the second end-of-arm tool and holds the first and second subcomponents together under the first load and at the initial position, wherein at least one of the first and second end-of-arm tools includes a plurality of linear actuators mounted thereon, each of the plurality of linear actuators adapted to apply external loads, independent of the first force, to the first and second subcomponents to distort the first and second subcomponents relative to the initial position and establish a working position of the second subcomponent relative to the first subcomponent, without transferring reaction forces to the first and second robot arms.

According to another aspect of the present disclosure, the component assembly system further comprises a third robot arm having a joining tool mounted thereon, wherein the system controller is adapted to control the third robot arm to bring the joining tool into engagement with the first and second subcomponents and join the first and second subcomponents to one another.

According to another aspect of the present disclosure, the joining tool is a welding tool adapted to weld the first subcomponent to the second subcomponent.

According to another aspect of the present disclosure, the component assembly system further comprises sensors adapted to detect when the first and second end-of-arm tools are locked to one another and send a signal back to the system controller.

According to another aspect of the present disclosure, the component assembly system further comprises a first force gauge mounted on the first end-of-arm tool adapted to measure the forces placed on the first end-of-arm tool by the first robot arm, and a second force gauge mounted on the second end-of-arm tool adapted to measure the forces placed on the second end-of-arm tool by the second robot arm.

According to another aspect of the present disclosure, the first and second robot arms are adapted to be controlled by the system controller based on one of position control, wherein the position of the first and second robot arms is controlled based on the three dimensional position of the robot arm within a given space, and force control, wherein the position of the first and second robot arms is controlled based on the forces placed on the first and second end-of-arm tools by the first and second robot arms as measured by the first and second force gauges.

According to another aspect of the present disclosure, the system controller is adapted to use force control to control movement of the first and second robot arms when the first and second interlocking mechanisms are engaged and the first and second end-of-arm tools are locked together, and to use position control to control movement of the first and second robot arms when the first and second interlocking mechanisms are not engaged and the first and second end-of-arm tools are free to move relative to one another.

According to another aspect of the present disclosure, the plurality of linear actuators are independently controllable and each of the plurality of linear actuators includes a force sensor and a position sensor, wherein the force sensors are adapted to send real-time force feedback to the system controller and the position sensors are adapted to send real time positional information to the system controller, further wherein the system controller is adapted to independently control and vary the force applied by each of the plurality of linear actuators using closed loop control of the position and force applied by each of the plurality of linear actuators.

According to several aspects of the present disclosure, an end-of-arm tool system for holding a component during assembly comprises a first end-of-arm tool for grasping and holding a first subcomponent and adapted to be mounted onto a first robot arm and a second end-of-arm tool for grasping and holding a second subcomponent and adapted to be mounted onto a second robot arm. An interlocking mechanism adapted to lock the first and second end-of-arm tools together and to maintain a first force between the first and second subcomponents, wherein external loads applied to the first and second subcomponents are not transferred to the first and second robot arms, and a plurality of linear actuators mounted onto at least one of the first and second end-of-arm tools and adapted to apply external loads to the first and second subcomponents.

According to another aspect of the present disclosure, the plurality of linear actuators are adapted to independently apply an external load directly onto one of the first and second subcomponents.

According to another aspect of the present disclosure, each of the plurality of linear actuators includes a force sensor and a position sensor, wherein the force sensors are adapted to send real-time force feedback to a system controller and the position sensors are adapted to send real time positional information to the system controller, the system controller using closed loop control of the position and force applied by the plurality of linear actuators.

According to another aspect of the present disclosure, the end-of-arm tool system further comprises an insert located between the plurality of linear actuators and the first and second subcomponents and adapted to apply external loads from the plurality of linear actuators to the first and second subcomponents, wherein the insert is shaped to apply a specific load profile to the first and second subcomponents.

According to another aspect of the present disclosure, the end-of-arm tool system further comprises a plurality of different inserts, wherein each insert is customized for different first and second subcomponents having different shape profiles, wherein the end-of-arm tool system is flexible and can be used to assembly different first and second subcomponents having different shape profiles.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
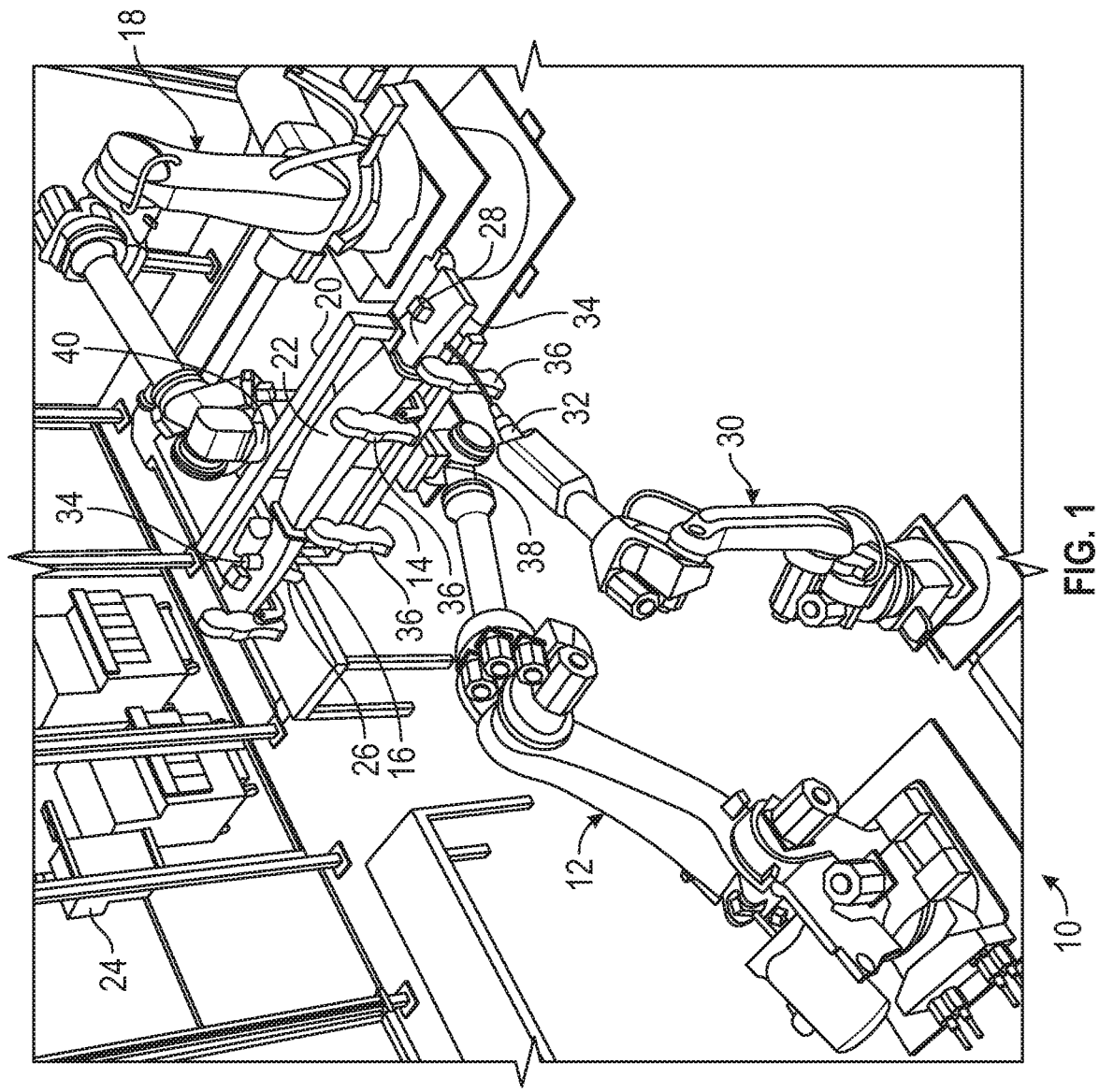
FIG. 1 is a perspective view of the component assembly system according to an exemplary embodiment.
Figure 2:
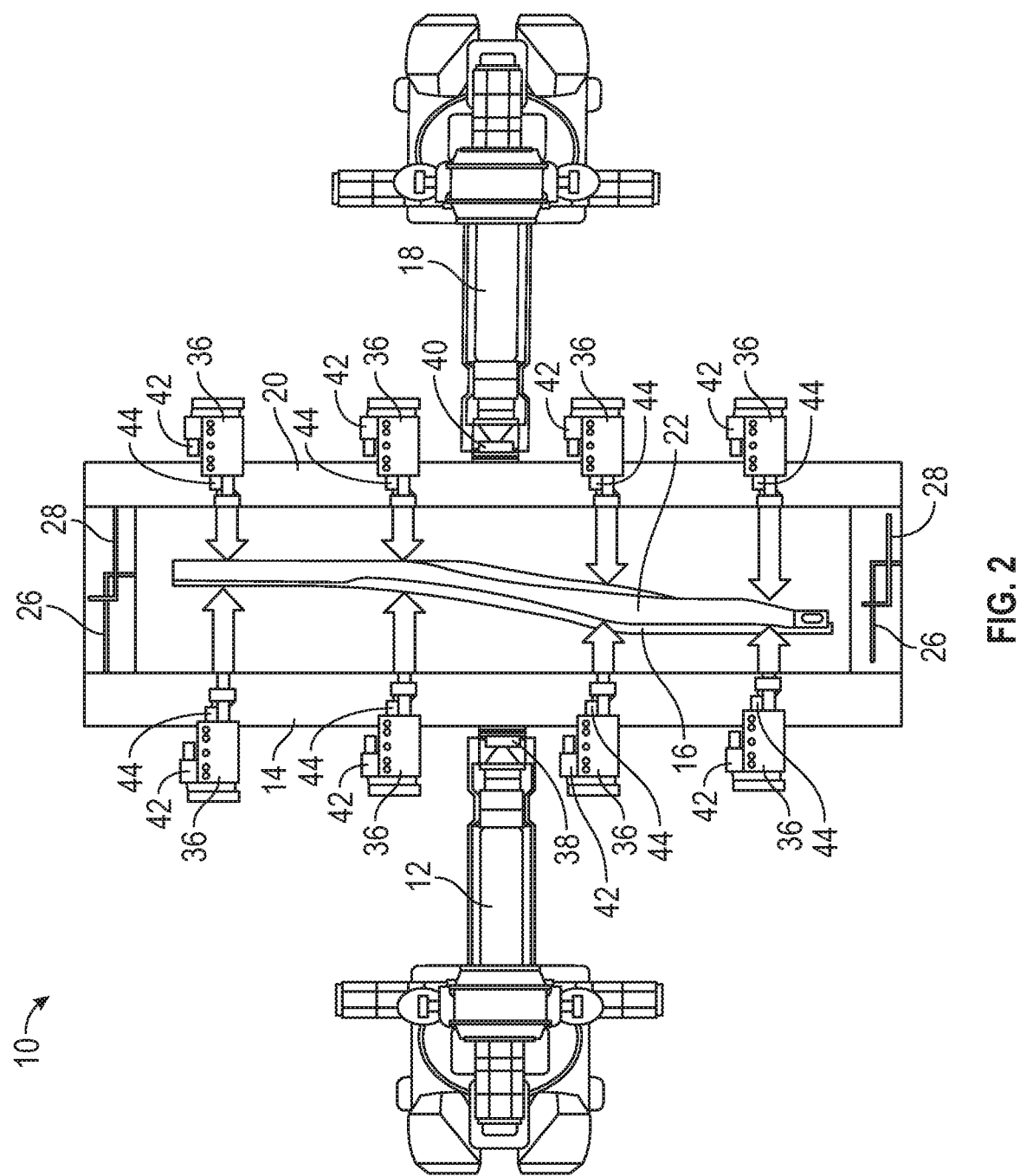
FIG. 2 is top view of the end-of-arm tools of the component assembly system shown in FIG. 1.

Referring to FIGS. 1 and 2, a component assembly system of the present disclosure is shown generally at 10. The component assembly system 10 comprises a first robot arm 12 with a first end-of-arm tool 14 mounted thereon. The first end-of-arm tool 14 is adapted to grasp a first subcomponent 16 and hold the first subcomponent 16 during the assembly process. A second robot arm 18 has a second end-of-arm tool 20 mounted thereon that is adapted to grasp a second subcomponent 22 and hold the second subcomponent 22 during the assembly process.

The first and second subcomponents 16, 22 may be, as a non-limiting example, a panel configured as a decklid or liftgate for an automotive vehicle. Alternatively, the first and second subcomponents 16, 22 may be an aircraft fuselage panel, a door panel for a consumer appliance, an armrest for a chair, or any other subcomponent configured to be joined or attached to another subcomponent. The first and second subcomponents 16, 22 may be formed from any suitable material, such as, metal, plastic, a composite, and the like.

The first and second robot arms 12, 18 may be a programmable mechanical arm, may include hand, wrist, elbow, and shoulder portions (not shown), and may be remotely-controlled by pneumatics and/or electronics. The first and second robot arms 12, 18 may be, as non-limiting examples, a six-axis articulated robot arm, a Cartesian robot arm, a spherical or polar robot arm, a selective compliance assembly robot arm, and the like. In one non-limiting example, the first and second robot arms 12, 18 may be a six-axis articulated robot arm.

A system controller 24 is adapted to control the first and second robot arms 12, 18 and first and second end-of-arm tools 14, 20. The system controller 24 is a non-generalized, electronic control device having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code. The system controller 24 moves the robotic arms 12, 18 and actuates the end-of-arm tools 14, 20 to bring the end-of-arm tools 14, 20 to a position to grasp the subcomponents 16, 22 and bring the first and second end-of arm tools 14, 20 into position to properly position the first and second subcomponents 16, 22 relative to each other. Additionally, the system controller 24 applies a first force on the first and second subcomponents 16, 22 to establish an initial position of the second subcomponent 22 relative to the first subcomponent 16. Movement of the robotic arms 12, 18 by the system controller 24 is based on executable code stored in memory or provide to the system controller 24.

An interlocking mechanism 26 is mounted onto at least one of the first end-of-arm tool 14 and the second end-of-arm tool 20. The interlocking mechanism 26 locks the first end-of-arm tool 14 to the second end-of-arm tool 20 and holds the first and second subcomponents 16, 22 together under the first load and at the initial position. In one non-limiting embodiment, the interlocking mechanism 26 is mounted onto the first end-of-arm tool 14 and is adapted to engage the second end-of-arm tool 20 to lock the first and second end-of-arm tools together and to hold the first and second subcomponents 16, 22 together under the first load and at the initial position. Alternatively, as shown in FIG. 2, a first interlocking mechanism 26 is mounted onto the first end-of-arm tool 14 and a second interlocking mechanism 28 is mounted onto the second end-of-arm tool 20. The first and second interlocking mechanisms 26, 28 engage one another and lock the first end-of-arm tool 14 to the second end-of-arm tool 20, thereby locking the first and second subcomponents 16, 22 into an initial position relative to one another.

A third robot arm 30 includes a joining tool 32 mounted thereon. The joining tool 32 is adapted to join the first subcomponent 16 to the second component 22. The third robot arm 30 is controlled by the system controller 24 to bring the joining tool 32 into engagement with the first and second subcomponents 16, 22. The third robot arm 30 may be a programmable mechanical arm, may include hand, wrist, elbow, and shoulder portions (not shown), and may be remotely-controlled by pneumatics and/or electronics. The third robot arm 30 may be, as non-limiting examples, a six-axis articulated robot arm, a Cartesian robot arm, a spherical or polar robot arm, a selective compliance assembly robot arm, and the like. In one non-limiting example, the third robot arm 30 may be a six-axis articulated robot arm.

It should be understood that the joining tool 32 can be any type of joining tool appropriate for joining subcomponents of different materials and characteristics. In the exemplary embodiment shown in FIGS. 1 and 2, the joining tool 32 is a welding tool adapted to create a welded attachment of the first subcomponent 16 to the second subcomponent 22.

The component assembly system 10 further includes sensors 34 adapted to detect when the first and second end-of-arm tools 14, 20 are locked to one another. Once the first and second end-of-arm tools 14, 20 are locked together, a signal is sent to the system controller 24. Once the first and second end-of-arm tools 14, 20 are locked together and the first and second subcomponents 16, 22 are locked in engagement, the system controller 24 will proceed with the assembly process. Sensors 34 on the first and second interlocking mechanisms 26, 28 verify that the first and second interlocking mechanisms 26, 28 are engaged and that the first and second end-of-arm tools 14, 20 are locked together. The sensors 34 send a signal to the system controller 24 to provide feedback to the system controller 24 that the first and second end-of-arm tools 14, 20 are locked together.

With the first and second end-of-arm tools 14, 20 locked together, the first and second subcomponents 16, 22 can be welded. With the first and second end-of-arm tools 14, 20 locked together, the first and second subcomponents 16, 22 cannot move relative to one another so thermal distortion and warping can be minimized during the welding process. Additionally, it may be desirable to induce a pre-load on the first and second subcomponents 16, 22 to counter anticipated thermal distortion during welding.

The first and second end-of-arm tools 14, 20 are adapted to exert external loads, independent of the first load, to the first and second subcomponents 16, 22 to distort the first and second subcomponents 16, 22 relative to the initial position and establish a working position of the second subcomponent 22 relative to the first subcomponent 16, without transferring reaction forces to the first and second robot arms 12, 18. The welding of the first and second subcomponents 16, 22 will create thermal expansion and deformation of the first and second subcomponents 16, 22. In order to counter this, external forces are placed on the first and second subcomponents 16, 22 before the welding begins. For example, it may be desirable to induce a pre-load or bend in the first and second subcomponents 16, 22 before welding. A bend without plastic deformation will induce a pre-load in the final component. When the weld is complete and the component is removed, the component will no longer be constrained by external forces, and will react in a predictable manner to the newly formed weld between the first and second components 16, 22.

The external forces can be applied to the first and second subcomponents 16, 22 in any suitable manner. In the component assembly system 10 of this exemplary embodiment, the first and second end-of-arm tools 14, 20 each include a plurality of linear actuators 36 mounted thereon. Each of the plurality of linear actuators 36 is positioned at a specific location on the end-of-arm tools 14, 20 to apply force on specific positions on the first and second subcomponents 16, 22. Alternatively, one of the first and second end-of-arm tools 14, 20 includes a plurality of linear actuators 36 mounted thereon.

Each of the plurality of linear actuators 36 are independently controllable and the system controller 24 is adapted to independently control and vary the force applied by each of the plurality of linear actuators 36 as the first and second subcomponents 16, 22 are joined together. Each of the plurality of linear actuators 36 includes a force sensor 42 and a position sensor 44, wherein the force sensors 42 are adapted to send real-time force feedback to the system controller 24 and the position sensors 44 are adapted to send real time positional information to the system controller 24. The system controller 24 is adapted to independently control and vary the force applied by each of the plurality of linear actuators 36 using closed loop control of the position and force applied by each of the plurality of linear actuators 36. This way, the forces applied to the first and second subcomponents 16, 22 can be carefully controlled in reaction to the thermal expansion, thermal distortion, or other reactions to the welding process as the welding process is taking place.

Ultimately, control of the position of the first and second subcomponents 16, 22 relative to one another and control of the external forces applied to the first and second subcomponents 16, 22 while the first and second subcomponents 16, 22 are being welded together allows the final shape and material characteristics of the assembled component to be controlled.

Figure 4:
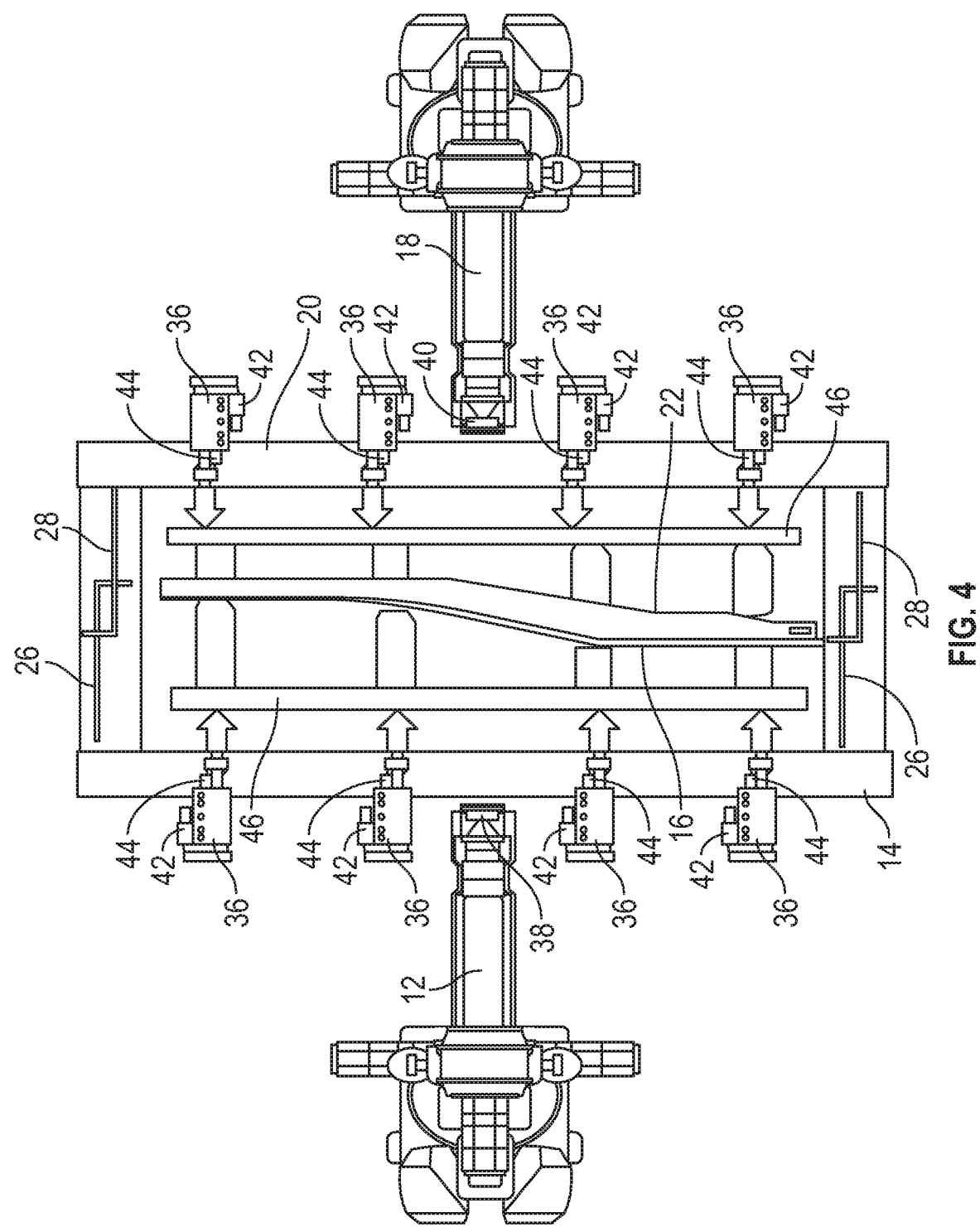
FIG. 4 is a top view of an alternative embodiment of the end-of-arm tools of the component assembly system shown in FIG. 1.

In the exemplary embodiment shown in FIG. 2, the plurality of linear actuators 36 are adapted to apply external forces directly onto the first and second subcomponents 16, 22. In an alternative embodiment, shown in FIG. 4, an insert 46 is located between the plurality of linear actuators 36 and the first and second subcomponents 16, 22. The insert 46 is and adapted to apply external loads from the plurality of linear actuators 36 to the first and second subcomponents 16, 22. The insert 46 is shaped to apply a specific load profile to the first and second subcomponents 16, 22. A plurality of inserts 46 can be used alternatively in the first and second end-of-arm tools 14, 20 to allow the end-of-arm tools 14, 20 to be flexible and able to hold different components having different shapes and sizes and requiring different load profiles.

The first end-of-arm tool 14 includes a first gauge 38 that is adapted to measure the forces applied to the first end-of-arm tool 14 by the first robot arm 12. The second end-of-arm tool 20 includes a second gauge 40 that is adapted to measure the forces applied to the second end-of-arm tool 20 by the second robot arm 18.

The first and second robot arms 12, 18 are adapted to be controlled by the system controller 24 based either on position control or force control. When the system controller 24 is using position control, the first and second robot arms 12, 18 are controlled based on the three-dimensional position of the first and second robot arms 12, 18 within the work space of the component assembly system 10. When using position control, the first and second robot arms 12, 18 are controlled to keep them in a specific position. When the system controller 24 is using force control, the first and second robot arms 12, 18 are controlled based on the force feedback measured by the first and second force gauges 38, 40. Force control allows the first and second end-of-arm tools 14, 20 to be controlled by the forces to ensure that the external forces placed on the first and second subcomponents 16, 22 are controlled. The first and second robot arms 12, 18 will allow movement relative to a specific position, but eliminate any interference with the external forces being induced on the first and second subcomponents 16, 22 by controlling the forces measured between the first robot arm 12 and the first end-of-arm tool 14 and between the second robot arm 18 and the second end-of-arm tool 20.

The system controller 24 is adapted to use force control to control movement of the first and second robot arms 12, 18 when the first and second interlocking mechanisms 26, 28 are engaged and the first and second end-of-arm tools 14, 20 are locked together. It is during this time that the first and second subcomponents 16, 22 are welded together, and it is during this time that force control must be used to ensure proper control of the external forces placed on the first and second subcomponents 16, 22. At all other times, when the first and second interlocking mechanisms 26, 28 are not engaged and the first and second end-of-arm tools 14, 20 are free to move relative to one another, the system controller 24 uses position control to control the first and second robot arms 12, 18.

The first and second end-of-arm tools 14, 20 must grasp the first and second subcomponents 16, 22 in a manner that allows the first and second subcomponents 16, 22 to be placed in contact with one another. One example of this is single side part holding, wherein the first and second end-of-arm tools 14, 20 are able to engage only a single side of the subcomponents 16, 22, thereby leaving the other sides of the subcomponents 16, 22 open. The component assembly system 10 of the exemplary embodiment is an electromagnetic fixture that grasps and holds the subcomponents 16, 22 magnetically. This method of grasping the subcomponents 16, 22 allows the subcomponents to be securely held without having clamping fingers that reach around and potentially interfere with the engagement of the first subcomponent 16 with the second subcomponent 22.

Figure 3:
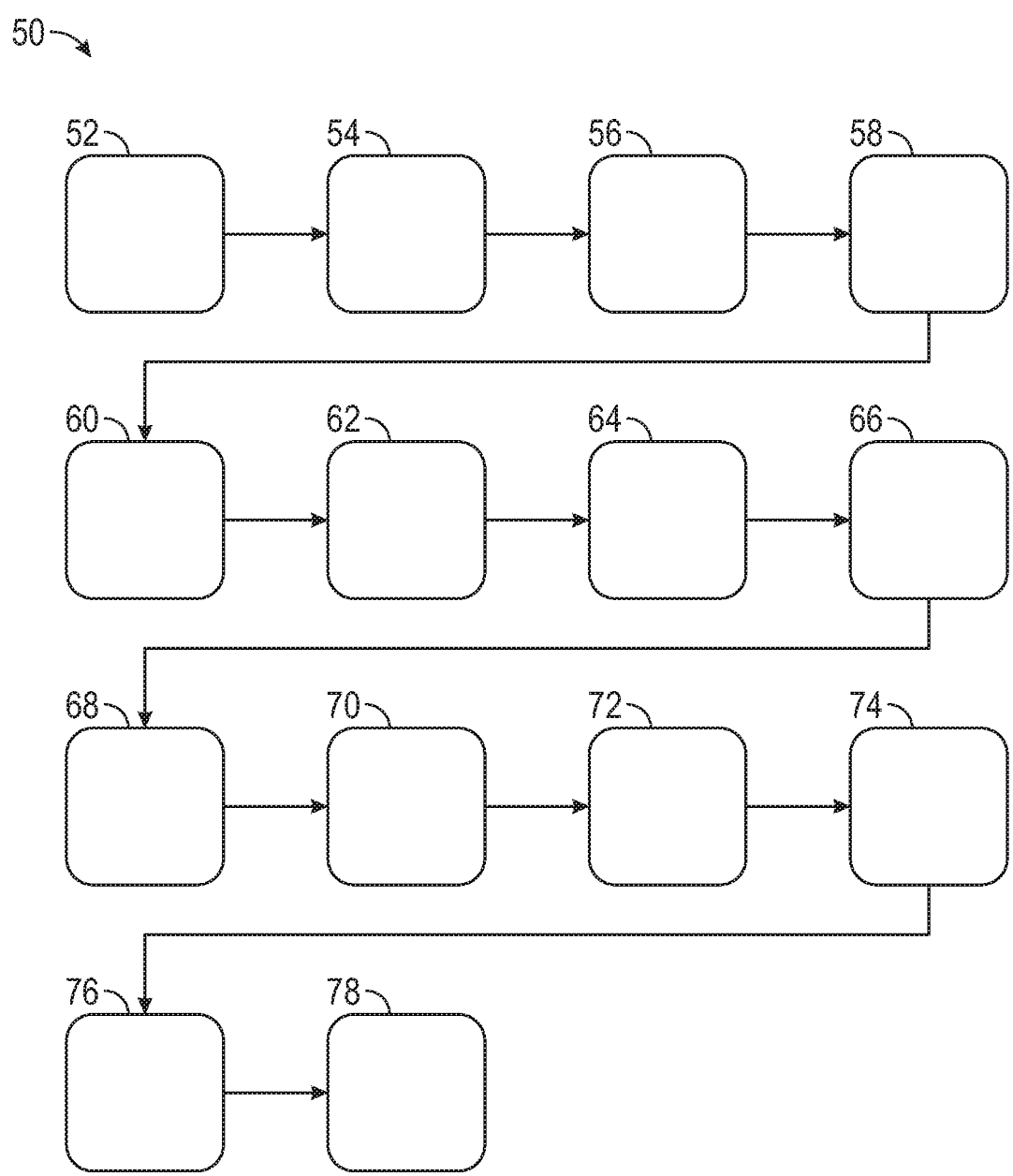
FIG. 3 is a schematic flowchart of a method of assembling a component according to an exemplary embodiment.

Referring to FIG. 3, a method of assembling a component is shown generally at 50. A method of assembling a component with the component assembly system 10 includes grasping 52 the first subcomponent 16 with the first end-of-arm tool 14 and grasping 52 the second subcomponent 22 with the second end-of-arm tool 20. After grasping 52 the first and second components 16, 22, the first and second robot arms 12, 18 move 54 the first and second end-of-arm tools 14, 20 to engage the first and second subcomponents 16, 22. A first force is applied to the first and second subcomponents 16, 22 with the first and second robot arms 12, 18 to establish an initial position of the second subcomponent 22 relative to the first subcomponent 16 without releasing the first subcomponent 16 from the first end-of-arm tool 14 and without releasing the second subcomponent 22 from the second end-of-arm tool 20.

After the first and second components 16, 22 are brought to the initial position the first and second end-of-arm tools 14, 20 are locked 56 together using the first and second interlocking mechanisms 26, 28. After confirming 58 that the first and second end-of-arm tools 14, 20 are locked together, sensors 34 mounted on the first and second interlocking mechanisms 26, 28 send a signal back to the system controller 24.

Once the system controller 24 gets feedback that the first and second end-of-arm tools 14, 20 are locked together, the system controller 24 stops using position control to control the first and second robot arms 12, 18 and begins using force control 60 to control the first and second robot arms 12, 18. External loads are applied 62 to the first and second subcomponents 16, 22 to distort the first and second subcomponents 16, 22 relative to the initial position. This forms the first and second subcomponents 16, 22 to a working position of the second subcomponent 22 relative to the first subcomponent 16 without releasing the first subcomponent 16 from the first end-of-arm tool 14 and without releasing the second subcomponent 22 from the second end-of-arm tool 20.

The welding of the first and second subcomponents 16, 22 will create thermal expansion and deformation of the first and second subcomponents 16, 22. In order to counter this, external forces are placed on the first and second subcomponents 16, 22 before the welding begins. For example, it may be desirable to induce a pre-load or bend in the first and second subcomponents 16, 22 before welding. A bend without plastic deformation will induce a pre-load in the final component. When the weld is complete and the component is removed, the component will no longer be constrained by external forces, and will react in a predictable manner to the newly formed weld between the first and second components 16, 22.

In the exemplary embodiment, external forces are applied to the first and second subcomponents 16, 22 by activating 64 at least one of a plurality of linear actuators 36. The linear actuators 36 are mounted on the first and second end-of-arm tools 14, 20 and are positioned to apply forces at specific locations on the first and second subcomponents 16, 22.

After external forces are applied, a joint is formed 66 between the first subcomponent 16 and the second subcomponent 22 with the joining tool 32 attached to the third robot arm 30. During the welding 66 of the first subcomponent 16 to the second subcomponent 22, the system controller 24 independently varies 68 the amount of force applied by each of the plurality of linear actuators 36 throughout the forming 66 of the joint.

After the joint is formed, the external forces are removed 70 from the first and second subcomponents 16, 22, the first and second interlocking mechanisms 26, 28 are dis-engaged 72 and the first and second end-of-arm tools 14, 20 are unlocked from each other. The system controller 24 now switches 74 control of the first and second robot arms 12, 18 back to position control. Finally, the first and second end-of-arm tools 14, 20 release 76 and the finished component is dropped 78.

A component assembly system 10 of the present disclosure offers several advantages. Subcomponents can be assembled without using a dedicated fixture. Additionally, the subcomponents 16, 22 can be influenced by external forces prior to and during the welding process to create predictable thermal deformation and material characteristics. Finally, the component assembly system 10 of the present disclosure can perform as discussed above and is flexible to accommodate different types of components formed therein and to vary the characteristics of the components formed therein.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of assembling a component, the method comprising:
grasping a first subcomponent with a first end-of-arm tool, wherein the first end-of-arm tool is attached to a first robot arm;
grasping a second subcomponent with a second end-of-arm tool, wherein the second end-of-arm tool is attached to a second robot arm;
moving the first and second end-of-arm tools to engage the first and second subcomponents;
applying a first force on the first and second subcomponents with the first and second robot arms and establishing an initial position of the second subcomponent relative to the first subcomponent without releasing the first subcomponent from the first end-of-arm tool and without releasing the second subcomponent from the second end-of-arm tool;
locking the first and second end-of-arm tools to one another, wherein the first and second end-of-arm tools hold the first and second subcomponents together under the first load and at the initial position;
switching the first and second robot arms from position control to force control, wherein the first and second robot arms no longer exert the first force onto the first and second components and only exert forces on the first and second end-of-arm tools to compensate for gravitational forces to support the end-of-arm tools;
applying external loads, independent of the first force, to the first and second subcomponents to distort the first and second subcomponents relative to the initial position and establish a working position of the second subcomponent relative to the first subcomponent without releasing the first subcomponent from the first end-of-arm tool and without releasing the second subcomponent from the second end-of-arm tool.

2. The method of claim 1, further comprising:
after applying external loads, independent of the first force, to the first and second subcomponents to distort the first and second subcomponents relative to the initial position and establish a working position of the second subcomponent relative to the first subcomponent without releasing the first subcomponent from the first end-of-arm tool and without releasing the second subcomponent from the second end-of-arm tool;
forming a joint between the first subcomponent and the second subcomponent with a joining tool attached to a joining robot arm to thereby assemble the component;
unlocking the first and second end-of-arm tools from one another; and
releasing the first end-of-arm tool, releasing the second end-of-am tool, and dropping the component.

3. The method of claim 2, further comprising:
after forming a joint between the first subcomponent and the second subcomponent with a joining tool attached to a joining robot arm to thereby assemble the component;
removing the external loads from the first and second subcomponents.

4. The method of claim 1, further comprising:
after locking the first and second end-of-arm tools to one another, wherein the first and second end-of-arm tools hold the first and second subcomponents together under the first load and at the initial position;

confirming that the first and second end-of-arm tools are locked to one another and sending a lock confirmation signal to a system controller.

5. The method of claim 2, further comprising:
after unlocking the first and second end-of-arm tools from one another, switching the first and second robot arms from force control to position control.

6. The method of claim 2, wherein applying external loads, independent of the first force, to the first and second subcomponents to distort the first and second subcomponents relative to the initial position and establish a working position of the second subcomponent relative to the first subcomponent without releasing the first subcomponent from the first end-of-arm tool and without releasing the second subcomponent from the second end-of-arm tool further comprises;
activating at least one of a plurality of linear actuators mounted on at least one of the first and second end-of-arm tools to apply forces on the first and second subcomponents.

7. The method of claim 6, further comprising:
simultaneously, while forming a joint between the first subcomponent and the second subcomponent with a joining tool attached to a joining robot arm to thereby assemble the component;
independently varying the amount of force applied by each of the plurality of linear actuators throughout the forming of the joint.

8. A component assembly system comprising:
a first robot arm having a first end-of-arm tool mounted thereon and adapted to grasp a first subcomponent and a second robot arm having a second end of arm tool mounted thereon and adapted to grasp a second subcomponent, wherein each of the first and second end-of-arm tools has single side part holding capability;
a system controller adapted to control the first and second robot arms and first and second end-of-arm tools to position the first and second subcomponents relative to one another and apply a first force on the first and second subcomponents to establish an initial position of the second subcomponent relative to the first subcomponent;
an interlocking mechanism mounted onto at least one of the first end-of-arm tool and the second end-of-arm tool, wherein the interlocking mechanism locks the first end-of-arm tool to the second end-of-arm tool and holds the first and second subcomponents together under the first load and at the initial position;
wherein at least one of the first and second end-of-arm tools includes a plurality of linear actuators mounted thereon, each of the plurality of linear actuators adapted to apply external loads, independent of the first force, to the first and second subcomponents to distort the first and second subcomponents relative to the initial position and establish a working position of the second subcomponent relative to the first subcomponent, without transferring reaction forces to the first and second robot arms.

9. The system of claim 8, further comprising a third robot arm having a joining tool mounted thereon, wherein the system controller is adapted to control the third robot arm to bring the joining tool into engagement with the first and second subcomponents and join the first and second subcomponents to one another.

10. The system of claim 9, wherein the joining tool is a welding tool adapted to weld the first subcomponent to the second subcomponent.

11. The system of claim 8, further comprising sensors adapted to detect when the first and second end-of-arm tools are locked to one another and send a signal back to the system controller.

12. The system of claim 8, further comprising a first force gauge mounted on the first end-of-arm tool adapted to measure the forces placed on the first end-of-arm tool by the first robot arm, and a second force gauge mounted on the second end-of arm tool adapted to measure the forces placed on the second end-of-arm tool by the second robot arm.

13. The system of claim 8, wherein the first and second robot arms are adapted to be controlled by the system controller based on one of position control, wherein the position of the first and second robot arms is controlled based on the three dimensional position of the robot arm within a given space, and force control, wherein the position of the first and second robot arms is controlled based on the forces placed on the first and second end-of-arm tools by the first and second robot arms as measured by the first and second force gauges.

14. The system of claim 13, wherein the system controller is adapted to use force control to control movement of the first and second robot arms when the first and second interlocking mechanisms are engaged and the first and second end-of-arm tools are locked together, and to use position control to control movement of the first and second robot arms when the first and second interlocking mechanisms are not engaged and the first and second end-of-arm tools are free to move relative to one another.

15. The system of claim 8, wherein the plurality of linear actuators are independently controllable and each of the plurality of linear actuators includes a force sensor and a position sensor, wherein the force sensors are adapted to send real-time force feedback to the system controller and the position sensors are adapted to send real time positional information to the system controller, further wherein the system controller is adapted to independently control and vary the force applied by each of the plurality of linear actuators using closed loop control of the position and force applied by each of the plurality of linear actuators.

16. An end-of-arm tool system for holding a component during assembly comprising:
a first end-of-arm tool for grasping and holding a first subcomponent and adapted to be mounted onto a first robot arm;
a second end-of-arm tool for grasping and holding a second subcomponent and adapted to be mounted onto a second robot arm;
an interlocking mechanism adapted to lock the first and second end-of-arm tools together and to maintain a first force between the first and second subcomponents, wherein external loads applied to the first and second subcomponents are not transferred to the first and second robot arms;
a plurality of linear actuators mounted onto at least one of the first and second end-of-arm tools and adapted to apply external loads to the first and second subcomponents.

17. The end-of-arm tool system of claim 16, wherein the plurality of linear actuators are adapted to independently apply an external load directly onto one of the first and second subcomponents.

18. The end-of-arm tool system of claim 17, wherein each of the plurality of linear actuators includes a force sensor and a position sensor, wherein the force sensors are adapted to send real-time force feedback to a system controller and the position sensors are adapted to send real time positional information to the system controller, the system controller using closed loop control of the position and force applied by the plurality of linear actuators.

19. The end-of-arm tool system of claim 17 further comprising an insert located between the plurality of linear actuators and the first and second subcomponents and adapted to apply external loads from the plurality of linear actuators to the first and second subcomponents, wherein the insert is shaped to apply a specific load profile to the first and second subcomponents.

20. The end-of-arm tool system of claim 19, further comprising a plurality of different inserts, wherein each insert is customized for different first and second subcomponents having different shape profiles, wherein the end-of-arm tool system is flexible and can be used to assembly different first and second subcomponents having different shape profiles.

\* \* \* \* \*